United States Patent [19]

Castrodale et al.

[11] 4,110,804
[45] Aug. 29, 1978

[54] READ/WRITE AND TUNNEL ERASE MAGNETIC HEAD ASSEMBLY

[75] Inventors: Daniel Owen Castrodale; Jeffrey Lynn Lovgren; Ralph Arthur Russell; Karl Allen Shidler, all of Rochester, Minn.

[73] Assignee: International Business Machines Corporation, Armonk, N.Y.

[21] Appl. No.: 817,755

[22] Filed: Jul. 21, 1977

[51] Int. Cl.² ............................................. G11B 5/26
[52] U.S. Cl. .................................... 360/118; 360/121
[58] Field of Search .................. 360/118, 121, 66, 123

[56] References Cited

U.S. PATENT DOCUMENTS

| 3,810,244 | 5/1974 | Hasegawa | 360/118 |
| 3,846,840 | 11/1974 | Childers et al. | 360/118 |

*Primary Examiner*—John H. Wolff
*Attorney, Agent, or Firm*—Keith T. Bleuer

[57] ABSTRACT

A magnetic head or transducer assembly for cooperating with a relatively moving magnetic medium and for reading and/or writing a track of magnetic information on the medium and for erasing the edges of the track and old information adjacent to the edges of a newly written track. The head comprises a central magnetic core with a gap on an active face of the head assembly and with a read/write coil on the magnetic core and comprises a pair of additional, erase magnetic cores on opposite sides of the central magnetic core and forming a pair of erase gaps on the active face of the head assembly. A single erase coil is disposed on opposite legs of the erase cores, and an L-shaped side bar completes the erase magnetic circuit for both of the erase cores and lies on one end of the erase coil and provides an air gap between it and the ends of each of these erase core legs so as to cause the action of the two erase gaps to be equal in their erasing action.

7 Claims, 4 Drawing Figures

READ/WRITE AND TUNNEL ERASE MAGNETIC HEAD ASSEMBLY

BACKGROUND OF THE INVENTION

1. Field of the Invention

This invention relates to magnetic heads or transducers and more particularly to such heads which provide a tunnel erasing action by means of erasing cores having gaps therein on an active face of the head on opposite sides of a central read/write core having a read/write gap in said active face.

2. Description of the Prior Art

Childers et al. U.S. Pat. No. 3,846,840, issued Nov. 5, 1974, discloses (see FIG. 1 in particular of this patent) a magnetic head which accomplishes tunnel erase by means of a pair of erase gaps disposed in cores on opposite sides of a central core in which a read/write gap is provided. Although the magnetic head of this patent is useful particularly for low density recording; when it is used for very high density recording, noise sources superimposed on the electrically fluctuating signal during either the record or playback processes significantly reduce the ability of the system in which the head is disposed to recover the recorded data. Two noise sources, applicable to the tunnel erase configurations and commonly used in connection with flexible disks, such as that disclosed in Flores et al. U.S. Pat. No. 3,668,658 issued June 6, 1975, are relevant to the invention hereof and are as follows:

(1) Imperfect guard band generation. If the magnetic flux in the erase gaps, which functions to tunnel erase on side guard bands and which is generated by the current in an erase coil, is not sufficient to saturate the magnetic medium, such as a magnetic disk with which the head is used, old data (previously recorded magnetic transitions) may not be completely erased. In addition, time varying magnetic flux from external sources, such as from the associated write magnetic circuit, superimposed on the magnetic erase flux can record weak magnetic transitions in the guard bands. In this case, if head-to-data track misregistration occurs during playback, the read/write gap is influenced by both the intended signal and also by noise from the old data and/or weak guard band magnetic transitions.

(2) Tunnel erase bias. With the head configuration of U.S. Pat. No. 3,846,840, a fraction of the magnetic flux in the tunnel erase gaps generated by current flowing through the erase coil also passes through the read/write gap. Assuming that the erasing action occurs at the same time as writing, as is quite often the case, this flux produced by the tunnel erase coil adds algebraically to the flux generated by the read/write coil and distorts the recording signal by upsetting the carefully balanced flux reversals of the recording signal.

SUMMARY OF THE INVENTION

It is an object of the invention to provide an improved tunnel erasing magnetic head construction for assuring guard bands on the opposite sides of a main data track which are completely erased without an increase in erase bias distortion in which the flux in the tunnel erase gaps generated by erase coil current passes through the read/write gap. More particularly it is an object of the invention to control the erase flux in the erase gaps without the need for tighter controls on the erase gap lengths and the throat height (height of the core portions providing the erase gaps) or other parameters in the erase magnetic circuits. It is also an object to provide such improvements in magnetic heads without a change in the circuitry connected to the erase coil of such a head being needed.

In a preferred form, the magnetic head of the invention includes a centrally disposed read/write core providing a read/write gap in the active surface of the magnetic transducer adapted to contact the magnetic disk or other medium, a side bar completing the magnetic circuit for the read/write gap, a read/write coil encircling a leg of a read/write core portion, a pair of erase cores on opposite sides of the read/write core and providing erase gaps in the active face of the head and on opposite sides of the read/write gap and spaced longitudinally with respect to the read/write gap in the direction in which the magnetic medium travels across the active face, a single erase coil encircling erase core portions remote from the read/write gap and terminating beyond the ends of these core portions, and an L-shaped side bar joined with other erase core portions closer to the read/write gap and terminating at the end of the erase coil to provide an air gap between the L-shaped side bar and the adjacent ends of the erase core portions more remote from the read/write gap.

DESCRIPTION OF THE PRIOR ART

Figure 1:
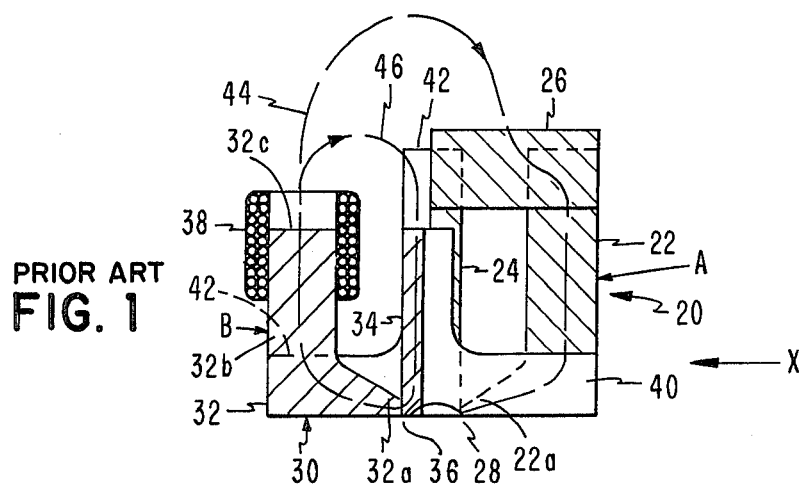
FIG. 1 is a longitudinal sectional view of a prior art magnetic recording head.

FIG. 1 shows a prior art magnetic head or transducer 20 which is similar in some respects to the magnetic head shown in FIG. 1 of U.S. Pat. No. 3,846,840. The head 20 comprises a pair of magnetically permeable core portions 22 and 24 forming a read/write core A and a side bar 26 bridging the upper ends of the core portions 22 and 24 as the head 20 is illustrated in FIG. 1. Core portion 22 is provided with a tapered end portion 22a which is disposed in close proximity to a side surface of core portion 24 so as to provide a read/write gap 28 in the active face 30 of the head 20 that is adapted to be in contact with a magnetic disk or other magnetic medium with respect to which magnetic reading or writing is accomplished by the head 20.

The head 20 also includes magnetically permeable erase core portions 32 and 34 forming an erase core B. The core portion 32 is provided with a tapered end 32a disposed in close proximity to a side surface of the core portion 34 thus providing an erase gap 36. An erase coil 38 is shown disposed on the leg 32b of core portion 32 which is remote from the gaps 36 and 28 and extends beyond the end 32c of the core portion 32, differing in this respect from the FIG. 1 construction of U.S. Pat. No. 3,846,840 because of physical constraints. A ceramic spacer 40 overlies the core portions 22 and 24 and is in alignment with the core portions 32 and 34 in the direction X which is that direction in which the disk or other magnetic medium passes across the active face 30. A similar ceramic spacer 42 is in alignment with the core portions 22 and 24 in the direction X.

For the purpose of illustrating the operation of the prior art head 20, a leakage flux path 44 and a major flux path 46 are illustrated in FIG. 1. The same two noise sources described above in connection with the recording head of U.S. Pat. No. 3,846,840 apply to the FIG. 1 magnetic head of the drawings hereof. Imperfect guard band generation may be provided by the magnetic head of FIG. 1 hereof due to the leakage flux, indicated by the flux path 44, which results from alternating current in the coil on core A. The flux in path 44 occurs during a write operation using gap 28 which may occur simultaneously with an erasing action by erase gap 36. The flux indicated by the flux path 44 is time varying in accordance with the magnetic transitions recorded by the read/write gap 28, and flux that passes through the gap 28 are indicated by the flux path 44 also passes through the erase gap 36 to record unwanted weak magnetic transitions in the guard band beneath the erase gap 36. Since unwanted transitions are in the guard band, if some head-to-data track misregistration occurs during reading or playback which is undesired but unavoidable at times, the read/write gap 28 is influenced during reading by both the intended signal from the main data track and also by the noise due to these weak guard band transitions.

The magnetic flux path 44 also shows a fraction of the flux in erase gap 36 and generated by current in erase coil 38 which also passes through the read/write gap 28. This flux generated by erase coil 38 adds to the flux for magnetically writing due to gap 28 and distorts the recorded signal on the main track underneath gap 28 by upsetting the carefully balanced flux reversals of the signal being recorded on the main track. The flux line 46 indicates the path in which it is desired that the flux from the erase coil 38 should travel, namely, directly through the core portion 34 to the erase gap 36.

With the construction of FIG. 1, the task of simultaneously minimizing the impact of both of the above mentioned noise sources is more difficult than with the construction of U.S. Pat. No. 3,846,840. With erase coil 38 extending beyond core portion 32 in FIG. 1, less flux will pass through erase gap 36 for the same current in erase coil 38, resulting in insufficient flux to saturate the magnetic medium. Increasing the erase current in the erase coil 38 to assure saturated guard bands on the opposite sides of the main track significantly increases the signal distortion from the tunnel erase bias in which flux generated by erase coil 38 current also passes through the read/write gap 28.

DESCRIPTION OF THE PREFERRED EMBODIMENT OF THE INVENTION

Figure 2:
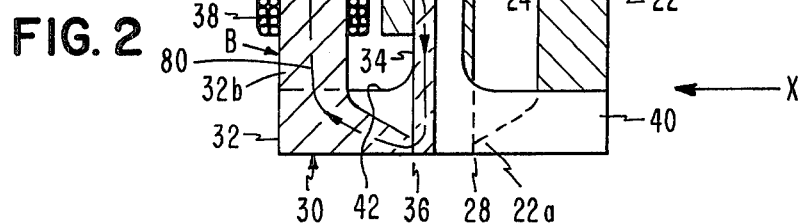
FIG. 2 is a longitudinal sectional view of the magnetic recording head of the invention consisting essentially of an L-shaped side bar added to the FIG. 1 construction.
Figure 4:
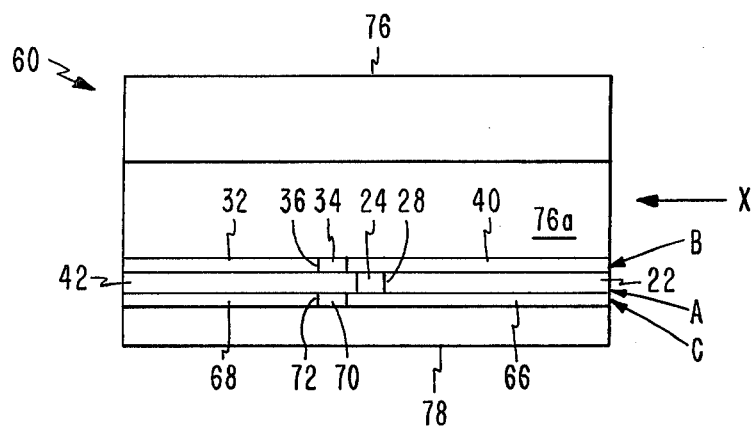
FIG. 4 is a bottom plan view of the magnetic recording head of the invention.
Figure 3:
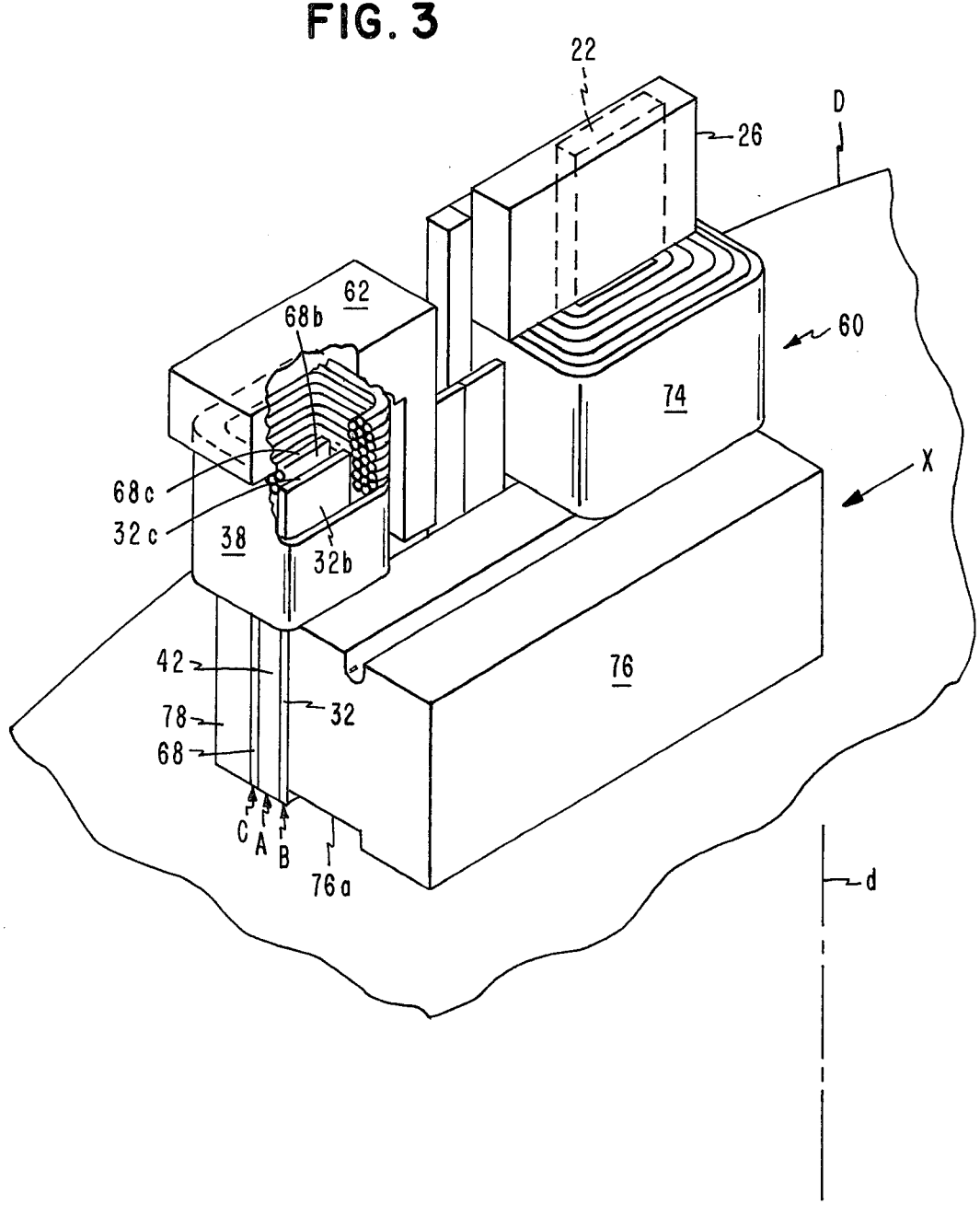
FIG. 3 is an isometric view of the magnetic recording head of the invention.

The magnetic head 60 of the invention which is illustrated in FIGS. 2, 3 and 4 includes all of the same parts 22-42 as described in connection with the head 20. In addition, the head 60 includes an L-shaped side bar 62 that lies across the upper end of the erase coil 38 as the head 60 is illustrated in FIG. 2 and bridges to the core portion 34. More particularly, the leg portion 62a which extends horizontally as the head 60 is illustrated in FIG. 2 lies in contact with the upper end of the erase coil 38; and the leg portion 62b, which extends vertically as the head 60 is illustrated in FIG. 2, is in essential contact with the core portion 34. The core portion 32 terminates short of the side bar 62 at its upper end 32c as the head 60 is illustrated in FIG. 2, and thus an air gap 64 is provided between the leg portion 62a of the side bar 62 and the upper end 32c of the core portion 32.

Additional parts of the head 60 are illustrated in FIGS. 3 and 4, and these include a ceramic spacer 66 in alignment with a second set of erase core portions 68 and 70 forming an erase core C. The core portion 68 has its upper end 68c within the erase coil 38 and at the same level as the upper end 32c of the erase core portion 32 so that the single erase coil 38 encloses both of the erase core portions 32 and 68 and the air gap 64 applies to both of the core portions 32 and 68. The core portions 68 and 70 provide an erase gap 72 between them which is similar to the gap 36 and is in alignment with the gap 36 in the direction perpendicular to direction X. The read/write coil 74 is shown in FIG. 3 and encircles the core portion 22. An outrigger 76 is fixed to the outer surfaces of the core portions 32 and 34 and to the outer surface of the spacer 40, and an outrigger 78 is fixed to the outer surfaces of the core portions 68 and 70 and the outer surface of the spacer 66. As will be observed from FIGS. 3 and 4, the outrigger 76 is considerably wider than the outrigger 78, and the outrigger 76 has a channel 76a extending in the direction X in which the magnetic medium, such as the disk D rotatable about center d and shown in FIG. 3, moves across the active surface 30 of the head 60. The disk D may for example be of the flexible type disposed in a protective envelope as disclosed in the above-mentioned U.S. Pat. No. 3,668,658.

It will be observed that the read/write core A including core portions 22 and 24 and spacer 42 constitutes a center layer with respect to a side layer provided by the erase core B including core portions 32 and 34 and spacer 40 and a side layer provided by the erase core C including core portions 68 and 70 and spacer 66, these layers thus constituting a sandwich of 3 active layers. The center read/write layer (core A) may for example be 0.013 inch (0.330mm) thick and the outer erase layers (cores B and C) may for example be 0.0065 (0.165mm) thick. The relatively wide outrigger 76 and the relatively thin outrigger 78 complete the 5 layers of which the head 60 is composed.

In operation, a time varying write current can be applied to the read/write coil 74 and at the same time a direct erase current may be applied to the erase coil 38. A main magnetic track is thereby written by the magnetic flux passing through the core A and side bar 26 and across the read/write gap 28. The disk D may be assumed to be moving in the direction X for this operation. A small fraction of a revolution later, the erase gaps 36 and 72 may be effective for erasing any existing or fringe magnetizations of the main magnetic track on the disk D at the two sides of the read/write gap 28. In this connection, the erase cores B and C are staggered in the direction X on the active face 30 with respect to the read/write core A as is particularly apparent from FIG. 4. The erase coil 38 for this purpose provides the erase flux passing through the air gap 64, the L-shaped side bar 62 and the erase cores B and C, with the side bar 62 and air gap 64 being in both of the erase magnetic circuits. Obviously, such erasing can be done using cores B and C and the erase gaps 36 and 72 in a subsequent revolution of the disk D. A reading action may take place when a main magnetic track on the disk D is used to induce correspondingly varying currents in the read/write coil 74.

For the purpose of illustrating the operation of the head 60, the major flux path 80 in erase core B is shown in FIG. 2, and it will be noticed that the flux path 80 passes through the air gap 64, the L-shaped side bar 62, the core portion 34, the erase gap 36, and back to the core portion 32 and coil 38. The L-shaped side bar 62 thus more completely closes the erase core B including the core portions 34 and 32 than in the FIG. 1 prior art structure, so that the reluctance of the erase magnetic circuit is reduced and less of the flux generated by the erase coil 38 passes through the core portion 22 and read/write gap 28. Since the L-shaped side bar 62 thus more completely closes the magnetic circuit of the erase core B, guard band erasure using the gap 36 and coil 38 is more perfect even though there is a writing action by the gap 28 at the same time as erasure by the gap 36 is taking place. Also, the minimizing of the flux path 44 minimizes the tunnel erase bias action in which flux generated by the current in erase coil 368 passes through the read/write gap 28 to distort the recorded signal on the magnetic media. The same remarks just made in connection with the erase core B and erase gap 36 apply as well to the erase core C which is partially closed by the same side bar 62.

The air gap 64 is an important part of the magnetic head of the invention. The reluctance of the air gap 64 dominates the reluctance in both of the erase magnetic circuits, the one circuit including the erase core B and the other magnetic circuit including the core C. This is particularly true since the gap 64 is completely within the erase coil 38, the current in which influences the magnetic field distribution within the gap 64. The air gap 64 therefore provides a balance between the reluctances of the two erase magnetic circuits, since the gap is a part of both and is a dominant part of the total reluctance of each erase magnetic circuit. The presence of the air gap 64 in the design also provides reproducibility in the manufacture of magnetic heads; in other words, the erasing action by the gaps 36 and 72 will be consistent in quantity production of the magnetic heads of the invention. Incidentally, an attempt to simultaneously close the two erase magnetic circuits, including the core portions 32 and 34 for one of the magnetic circuits and the core portions 68 and 70 for the other magnetic circuit, using a single piece of ferrite, such as the L-shaped side bar 62, will encounter balance and reproducibility problems unless a dominant air gap, such as the air gap 64, is left to mask unavoidable variable gaps at bond lines, etc. In this connection, it may be mentioned that the side bar 26 is connected by a simple bond to the core portions 22 and 24, and the side bar 62 is connected by simple bonds to the core portions 34 and 70. Epoxy, for example, may be used in making these bonds and the bonds are made as thin as possible; however, variations of the bond thicknesses may occur in an actual production run of the heads of the invention so that the reluctance of these bonds varies accordingly. The single air gap 64 between side bar 62 and the upper ends 32c and 68c of the core portions 32 and 68 however provides a dominant part of the reluctance of each of the erase magnetic circuits so that these variations of bond reluctances are insignificant.

In this connection, it may be noted that the magnetic reluctance of each of the erase magnetic circuits including side bar 62 and cores B and C of head 60 of the invention is about 50 to 70 percent of the reluctance of the corresponding erase magnetic circuits in the prior art FIG. 1 structure. This is due to the fact that the side bar 62 for the most part closes the erase cores B and C in the head 60 while there is a very large air gap between the core portions 32 and 34, for example, in the head 20 of FIG. 1. Since the side bar 62 for the most part closes the erase cores B and C in head 60 and essentially contrains the erase flux to path 80 in core B and the corresponding path in core C, less of the erase flux from coil 38 passes through the read/write gap 28. In both heads 20 and 60, however, the air gaps are dominant with respect to the reluctances of the erase magnetic circuits. In the case of the FIG. 1 head 20, the reluctance of the air gap between the core portions 32 and 34 is about 95 percent of the complete reluctance of the erase magnetic circuit including the core portions 32 and 34; and, in the case of the head 60, the air gap 64 provides about 85 percent of the complete reluctance of each of the erase magnetic circuits including the two cores B and C. Although the percentage of reluctance provided by the shorter air gap 64 is not quite as high as the percentage of reluctance provided by the air gap between the core portions 32 and 34 in the head 20, nevertheless, the air gap 64 provides a sufficiently dominant portion of the reluctance of the erase magnetic circuits to provide a balance between the reluctances of the two erase magnetic circuits so that the flux in both of the gaps 36 and 72 is just about equal regardless of variations of reluctances at the bonds between the parts of the head 60. Incidentally, in attaining the improved results provided by the air gap 64, in an actual head 60, the air gap 64 was 0.02 inch (0.51mm) long while the median distance around each of the magnetic erase circuits was about 0.39 inch (9.9mm). Thus, the gap 64 had a length of about 5% of the median distance around each of the erase magnetic circuits. It will be understood that these dimensions are given only for the purpose of example and that these dimensions can well be changed within the teachings of the invention.

It is considered important that the erase coil 38 and the air gap 64 within the erase coil 38 are located coaxially with the upper legs 32b and 68b of the erase core portions 32 and 68, since the coil 38 and gap 64 are thus relatively remote from the read/write gap 28. The L-shaped side bar 62 thus provides a low reluctance path 80 for much of the erase flux and routes it away from the read/write core A and read/write gap 28. The fraction of the erase flux leaking through the read/write gap 28 is thus reduced about two-fold. Using the invention, approximately a two-fold increase in erase flux can be achieved in comparison with the erase flux of the head 20, without an increase in the erase bias distortion due to any erase flux generated by the erase coil passing through the read/write gap 28 and distorting the recorded signal.

As has also been noted, the magnetic head of the invention is similar in some respects to the magnetic head disclosed in U.S. Pat. No. 3,846,840. Many of the teachings of U.S. Pat. No. 3,846,840, particularly in connection with the FIG. 1 structure thereof, may thus be utilized in the construction and method of making the head of the invention. For example, the material of the magnetically permeable portions 24, 26, 22, 32, 34, 68, 70 and 62 may be made of the iron, nickel, zinc ferrite mentioned for the magnetically permeable parts of the transducers disclosed in U.S. Pat. No. 3,846,840. The spacers 42, 40 and 66 and the outriggers 76 and 78 may be made of the same material suggested for the non-permeable spacers and outriggers of the transducers of U.S. Pat. No. 3,846,840, namely, baria titania ceramic. As mentioned in U.S. Pat. No. 3,846,840, one of the advantages of the usage of these materials is that they have substantially the same coefficient of thermal expansion so that there is no wraping in the head. Although epoxy has been mentioned above for bonding, bonding of certain parts of the transducer of the invention may be by means of a glass, such as a lead borosilicate glass, particularly in the gaps 28, 36 and 72.

Advantageously, the L-shaped side bar 62 located on the end of the erase coil 38 encircling both of the erase core portions 32 and 68, with the provision of the air gap 64 completely within the coil 38 and between the side bar 62 and the upper ends 32c and 68c of the core portions 32 and 68, provides a tunnel erase construction in which the side guard bands may be effectively erased using sufficient erase current in the coil 38 to saturate the medium, such as disk D, without unduly increasing the erase current to thereby significantly increase the signal distortion from tunnel erase bias in which a significant fraction of the flux in the erase gaps 36 and 72 passes also through the read/write gap 28. This may be accomplished without the need for unduly tight controls on the length and height of the gaps 28, 36 and 72 and thicknesses of bonding material between the parts forming the read/write and erase magnetic circuits. No change in erase electronic circuitry is needed, and the results are obtained in a low cost manner, easily adding the L-shaped side bar 62 to the prior art FIG. 1 construction for example. The single side bar 62 is also obviously of less cost than two side bars, one for each erase magnetic circuit, would be.

We claim:

1. A magnetic head assembly for transferring data and for erasing edge portions of recorded data comprising:
   a center data transfer layer and a pair of outer erase layers on opposite sides of the center layer disposed in a sandwich structure,
   said center layer including a first core of magnetically permeable material which is closed except for a transducing gap provided in the core on an active surface of said head assembly, each of said outer layers including a further core formed by first and second core portions of magnetically permeable material having ends of these portions at said active surface providing an erasing gap on said active surface spaced longitudinally of said center and outer layers with respect to said transducing gap and said first and second core portions having remote ends that are remote from said active surface, said first core portions of said outer layers being opposite to each other transversely of said center and outer layers and said second core portions of said outer layers being opposite to each other transversely of said center and outer layers;
   a data transfer electrical coil disposed about said core of said center layer;
   a single erase electrical coil disposed about both of said first core portions of said outer layers; and
   a bridging bar of magnetically permeable material bridging said remote ends of both of said outer layers and being short of ends of a pair of said core portions that are opposite each other transversely of said layers to thus form non-permeable gaps whereby to increase the magnetic reluctance of said cores of both of said outer layers.

2. A magnetic head assembly as set forth in claim 1, said first core portions of said outer layers being more remote from said transducing gap of said center layer longitudinally of said center and outer layers than said second core portions of said outer layers, and said remote ends of said outer layers forming said gaps with said bridging bar being the ends of said first core portions.

3. A magnetic head assembly as set forth in claim 2, said single erase electrical coil being disposed about said gaps between said bridging bar and the said remote ends of said first core portions.

4. A magnetic head assembly as set forth in claim 1, said second core portions of said erase layers extending perpendicularly with respect to said active surface, and said first core portions of said erase layers extending slantwise with respect to said active surface and longitudinally of said center and erase layers away from said transducing gap and said erasing gaps.

5. A magnetic head assembly as set forth in claim 1, said gaps being between said bridging bar and said remote ends of said first core portions and providing approximately 85% of the magnetic reluctance of an erase magnetic circuit of said core of each of said outer layers.

6. A magnetic head assembly as set forth in claim 1, said gaps being between said bridging bar and said remote ends of said first core portions being air gaps and each having a length of about 5% of the median distance around each of two erase magnetic circuits provided by said bar and said cores of said erase layers.

7. A magnetic head assembly for recording or reading data and for erasing edge portions of newly recorded data and previously recorded data comprising:
   a center read/write layer and a pair of outer erase layers on opposite sides of the center layer for recording or reading and erasing data associated with a single data track,
   said center layer including a core of magnetically permeable material which is closed except for a transducing gap provided in the core on an active surface of said head assembly, each of said outer layers including first and second core portions of magnetically permeable material having ends of these portions at said active surface providing an erasing gap on said active surface spaced longitudinally of said center and erasing layers with respect to said read/write gap and said first and second core portions having remote ends that are remote from said active surface, said second core portions being opposite to each other transversely of said center and erase layers and extending normally to said active surface and said first core portions of said outer layers being opposite to each other transversely of said center and erase layers and extending slantwise with respect to said active surface and longitudinally of said erase and center layers and away from said second core portions so as to provide a spacing of said first core portions with respect to said second core portions at their said remote ends;
   a read/write electrical coil disposed about said core of said center layer;
   a single erase electrical coil disposed about both of said first core portions of said outer layers and extending in a direction away from said active surface and beyond said remote ends of said first core portions; and
   an L-shaped bar of magnetically permeable material having one leg thereof in face to face contact with said second core portions and having its other leg in contact with an end of said single erase electrical coil so as to thereby provide gaps between said bar and said remote ends of said first core portions and within said single erase electrical coil.

* * * * *

UNITED STATES PATENT AND TRADEMARK OFFICE
CERTIFICATE OF CORRECTION

PATENT NO. : 4,110,804

DATED : August 29, 1978

INVENTOR(S) : Daniel O. Castrodale, Jeffrey L. Lovgren, Ralph A. Russell and Karl A. Shidler It is certified that error appears in the above-identified patent and that said Letters Patent are hereby corrected as shown below:

Column 7, line 58, after the word "of" (first instance), insert --said remote--.

Signed and Sealed this

Twenty-fourth Day of July 1979

[SEAL]

Attest:

LUTRELLE F. PARKER

Attesting Officer

Acting Commissioner of Patents and Trademarks